(12) United States Patent
Graham et al.

(10) Patent No.: US 7,603,917 B2
(45) Date of Patent: Oct. 20, 2009

(54) FULL-AXIS SENSOR FOR DETECTING INPUT FORCE AND TORQUE

(75) Inventors: Mark Graham, Middlesbrough (GB); Chris Lussey, Richmond (GB)

(73) Assignee: Peratech Limited, Durham (GB)

( * ) Notice: Subject to any disclaimer, the term of this patent is extended or adjusted under 35 U.S.C. 154(b) by 72 days.

(21) Appl. No.: 11/573,322

(22) PCT Filed: Aug. 8, 2005

(86) PCT No.: PCT/GB2005/003109

§ 371 (c)(1),
(2), (4) Date: Oct. 30, 2007

(87) PCT Pub. No.: WO2006/016138

PCT Pub. Date: Feb. 16, 2006

(65) Prior Publication Data

US 2008/0264183 A1   Oct. 30, 2008

(30) Foreign Application Priority Data

Aug. 9, 2004   (GB) ................................. 0417683.0

(51) Int. Cl.
*G01D 7/00* (2006.01)
(52) U.S. Cl. ................................. 73/862.043
(58) Field of Classification Search .................................
73/862.041–862.046
See application file for complete search history.

(56) References Cited

U.S. PATENT DOCUMENTS

| | | | |
|---|---|---|---|
| 4,094,192 A | 6/1978 | Watson et al. | |
| 4,320,392 A | 3/1982 | Giovinazzo et al. | |
| 4,555,960 A | 12/1985 | King | |
| 4,811,608 A | 3/1989 | Hilton | |
| 5,113,714 A | 5/1992 | Eklund et al. | |
| 5,222,400 A | 6/1993 | Hilton et al. | |
| 5,262,777 A | 11/1993 | Low et al. | |
| 5,452,615 A | 9/1995 | Hilton | |
| 5,497,668 A * | 3/1996 | Okada ................. 73/862.626 |
| 5,541,578 A | 7/1996 | Lussey | |
| 5,565,891 A | 10/1996 | Armstrong | |
| 5,589,828 A | 12/1996 | Armstrong | |

(Continued)

FOREIGN PATENT DOCUMENTS

DE   3937164   5/1991

(Continued)

*Primary Examiner*—Max Noori
(74) *Attorney, Agent, or Firm*—Stites & Harbison PLLC; Douglas E. Jackson

(57) ABSTRACT

A sensor (100) for detecting input force and/or torque with six degrees of freedom for use as a computer input device is provided. The sensor has a technically simple detection mechanism which obviates the need for complex and fragile securing components. A user-manipulable core (106) is enclosed in a casing (109). Electrodes (114) in the casing (109) are separated from the core (106) by a layer of elastically deformable conductive polymer (108). Electric current flows between the core (106) and the electrodes (114). The polymer (108) has variable resistivity depending on the stress it experiences. Manipulation of the core (106) causes deformation of the polymer (108); the type of deformation, and hence the type of force/torque applied to core (106), is determinable from the currents flowing through the electrodes (114).

10 Claims, 13 Drawing Sheets

U.S. PATENT DOCUMENTS

| | | | |
|---|---|---|---|
| 5,591,924 | A | 1/1997 | Hilton |
| 5,668,318 | A * | 9/1997 | Okada .................. 73/504.11 |
| 5,706,027 | A | 1/1998 | Hilton et al. |
| 5,729,249 | A | 3/1998 | Yatsutake |
| 5,798,748 | A | 8/1998 | Hilton et al. |
| 5,805,137 | A | 9/1998 | Yatsutake |
| 5,808,540 | A | 9/1998 | Wheeler et al. |
| 5,850,040 | A * | 12/1998 | Okada .................. 73/504.04 |
| 5,854,622 | A | 12/1998 | Brannon |
| 6,033,309 | A | 3/2000 | Couch et al. |
| 6,098,461 | A * | 8/2000 | Okada .................. 73/514.34 |
| 6,291,568 | B1 | 9/2001 | Lussey |
| 6,310,606 | B1 | 10/2001 | Armstrong |
| 6,329,812 | B1 | 12/2001 | Sundin |
| 6,349,604 | B1 | 2/2002 | Byun et al. |
| 6,378,381 | B1 * | 4/2002 | Okada et al. ........... 73/862.043 |
| 6,409,845 | B1 | 6/2002 | Tellenbach |
| 6,450,040 | B1 | 9/2002 | Dorsch et al. |
| 6,495,069 | B1 | 12/2002 | Lussey et al. |
| 6,512,364 | B1 * | 1/2003 | Okada .................. 324/158.1 |
| 6,622,575 | B1 | 9/2003 | Nagata |
| 6,646,540 | B1 | 11/2003 | Lussey |
| 6,951,143 | B1 | 10/2005 | Adderton et al. |
| 7,145,432 | B2 | 12/2006 | Lussey et al. |
| 7,363,814 | B2 * | 4/2008 | Okada .................. 73/504.04 |
| 2002/0000971 | A1 | 1/2002 | Armstrong |
| 2002/0092364 | A1 | 7/2002 | Minne et al. |
| 2002/0196232 | A1 | 12/2002 | Chen |
| 2003/0048252 | A1 | 3/2003 | Fukushima et al. |
| 2003/0102422 | A1 | 6/2003 | Gombert |
| 2003/0102426 | A1 | 6/2003 | Gombert |
| 2003/0103217 | A1 | 6/2003 | Gombert |
| 2004/0046735 | A1 | 3/2004 | Gombert et al. |
| 2004/0243724 | A1 | 12/2004 | Gombert |
| 2006/0050051 | A1 | 3/2006 | Hilton |

FOREIGN PATENT DOCUMENTS

| | | |
|---|---|---|
| DE | 19635857 | 3/1998 |
| WO | WO 00/79546 | 12/2000 |
| WO | WO 03/077106 | 9/2003 |
| WO | WO 03/077107 | 9/2003 |

\* cited by examiner

FULL-AXIS SENSOR FOR DETECTING INPUT FORCE AND TORQUE

This invention relates to sensors for detecting input force and/or torque. Sensors of this type are used as input devices for computers, e.g. to provide input information relating to the force and/or torque applied to the sensor. Sensors of this type are incorporated into hand-held controllers for computers and the like in order to sense input movement for conversion into electrical signals e.g. to effect onscreen commands.

The present invention relates to so-called six-axis sensors because it provides means for sensing input force and/or torque with six degrees of freedom.

Six-axis sensors, i.e. sensors that can detect physical input with six degrees of freedom, have been developed inter alia to overcome the limitations of sensors in known computer physical input devices e.g. joysticks, mouses, tracker balls and the like. For example, a six-axis sensor may independently detect translational motion along three mutually perpendicular axes and rotational motion about those three axes.

Physical input sensors generally fall into two categories: "displacement" sensors which detect movement, and "force/torque" sensors which detect applied forces and/or torque.

U.S. Pat. No. 5,591,924 and U.S. Pat. No. 5,706,027 describe force/torque sensors that contain a transforming apparatus which converts applied force and/or torque into translational components along three orthogonal axes. The translational movement is sensed using optoelectronic sensors.

US 2003/0102426 A describes a displacement sensor that detects relative movement between two objects using optoelectronic-measuring cells. One problem with optoelectronic arrangements is the complexity of components and expense of high quality light sensors needed to make the sensors sensitive. This makes them expensive to manufacture and prone to damage.

These sensors require complex mechanisms to transform forces into associated movement. To cope with complex forces, e.g. in three dimensions, the mechanics of the sensors becoming even more involved. The number of parts and their sensitivity makes the sensors expensive to make and easy to damage.

U.S. Pat. No. 5,262,777 describes an input device which detects externally applied pressure on a deformable surface. The deformable surface has force sensors embedded in or adjacent to it to detect the pressure at all points on the surface.

WO 98/33193 describes potential uses for an elastically deformable polymer composition which has a variable electrical resistivity that is variable in response to distortion forces acting on the composition. Materials of this type were developed by Peratech Limited and are also described in WO 99/38173. A potential use identified by Peratech Limited was a full three-axis switch, where a cylindrical block of the conductive polymer is contained with an insulating cylinder. A plurality of electrical point contacts are provided at locations around the cylinder wall that penetrate the wall to make contact with the outer surface of the conductive polymer. A metal conductive rod is inserted into physical and electrical contact with the centre of the block of conductive polymer to form an operating lever and one pole of the switch. The cylinder is firmly clamped so that motion of the lever will impart force to the block of conductive material, thereby changing its resistance. The change of resistance is proportional to the force applied. This means that the plurality of point contacts around the block can detect current flowing from the metal rod throughout the material and analyse the results to resolve forces in three dimensions. This device works by sampling the current flow at many locations around the cylinder to build up a picture of the forces acting on the block. Using an elastically deformable conductive material in place of e.g. optical sensors is advantageous because of its relative simplicity (fewer component parts). The resulting sensor may be more robust.

In contrast, the present invention builds on the possibilities of the elastically deformable conductive polymer with variable electrical resistivity to provide a sensor where the electrical signals received by electrodes are directly related to forces or movements applied to the sensor. The inventors have found that applying a particular configuration to electrodes with respect to a current source, a block or blocks of the polymer material and means for applying input force to the block of material can result in the currents through the electrodes being directly relatable to the direction and magnitude of a force or torque. Analysis of the sensed current, e.g. using a computer-processing step, gives an accurate indication of the applied force/torque.

At its most general, the present invention can be thought of as providing a network of current paths within a deformable conductive material with a variable resistivity that depends on the forces applied to the material, wherein the current paths have a number of directions which correspond to e.g. are parallel or perpendicular to notional axes that define three dimensional space. Electrodes that detect these current paths therefore receive information relating to forces experienced by the material in relation to one of these notional axes. Combinations of current paths may then directly relate to the direction of forces along or torques about one of the notional axis. The variable resistivity of the material means the size of the current is directly indicative of the size of the force. This direct relationship between detected current and applied force/torque direction and magnitude is not seen in the devices described above because the concept of using the current path as an indicator of direction of force is not considered.

According to a first aspect of the present invention, there is provided a sensor for detecting input force and/or torque, the sensor including: a core having a central region; a deformable material having variable resistance depending on forces applied to it positioned at least partially around the central region; input force means for transmitting to the deformable material applied force and/or torque relative to the central region; and a plurality of electrodes positioned against the deformable material, each electrode being at one end of a current path, each current path being the shortest path of current flow from the core to the electrode through the deformable material, wherein respective directions of three or more notional axes are represented by the directions of one or more of the current paths, the three or more notional axes providing a three-dimensional coordinate space. Force and/or torque may mean force with six degrees of freedom, e.g. translational force along three mutually perpendicular axis and torque about each of those axes.

Preferably, the deformable material is elastically deformable. It may be provided as a thin layer, i.e. less than 100 μm, preferably 33 μm.

The sensor may detect force and/or torque with six degrees of freedom; it may be arranged to detect force with fewer degrees of freedom, e.g. three or more. For detecting force with less than six degrees of freedom, either the electronics may be modified only to calculate for the necessary axes or a software driver may only interpret currents from the required axes. The sensor may be physically the same as a sensor that detects force with six degrees of freedom. Indeed, the sensor may be able to detect force in a selectable number of degrees of freedom. In operation, a current flows from a current source (the core surface) to each electrode along a current path which passes through the deformable material. The amount of current flowing through various combinations of the electrodes is detected. These combinations are selected to indicate different directional senses of applied force. The magnitude of the combinations may indicate the size of the applied force.

The current is preferably digitised and converted into serial information, which may be sent to a computer (e.g. PC) by any appropriate means (e.g. serial cable, USB, wireless RF, or infrared).

The three or more notional axes cover three-dimensional space, i.e. every point in three dimensional space is identifiable by a set of coordinates indicating distance along each of the axes, e.g. x, y, z in three dimensional Cartesian coordinates, where x, y and z may be numbers having positive or negative value, or a, b, c, d in a tetragonal coordinate system where each of four axes originate at the centroid of an imaginary tetrahedron and extend through one of its vertices, where a, b, c and d may be numbers having a positive value. Preferably, the notional axes provide a three-dimensional coordinate space where each point in space has a unique coordinate label. This means that the current paths have a known and unique direction in the coordinate space. Moreover, since their magnitude is also known, the current paths can be thought of as directly representing force vectors in an imaginary space. By suitably combining these vectors e.g. by resolving, adding or calculating moment about an origin, the size and direction of an input force with six degrees of freedom can be electronically translated e.g. for input into a computer.

Preferably, each of the current paths is parallel or perpendicular to one of the three or more notional axes. This may be achieved by having detecting electrodes on the same side of the deformable material as the core, or on the opposite side. Thus, the physical framework of the sensor may define an origin and a three-dimensional space defined by three or more axes either real or notional. The deformable material and electrodes are then positioned relative to the origin in relation to a current source so that current paths are defined in different directions, usually parallel to the defined three or more axes around the origin. The sensor may be arranged so that pairs of current paths are arranged which are orientated in the same direction but located on opposite sides of the origin. The currents flowing in these paths may be compared e.g. to find any difference to indicate that a force is being applied along that direction. For example, when no force is applied to the sensor, the same amount of current or no current at all may flow along both of the current paths, so that when the difference between the currents is detected, the value detected is zero. Practically, the internal electronics of the sensor may include a chip on an electronics board. The raw data (current) from the electrodes may be applied directly to the chip, whereupon data manipulation (e.g. comparison calculations) may be carried out to determine the information about forces in the chosen coordinate system. This information may then be passed to the target computer (e.g. PC). On the other hand, if a force is applied to the sensor so that the deformable material in one of the pair of current paths is squashed and the deformable material in the other of the pair of current paths is not affected, the values of the currents flowing in each of the current paths is different from each other, so the value of the difference is non-zero. To provide the different forces on the deformable material making up the pair of current paths, the sensor may contain an element (e.g. the core that contains the origin of the notional axes (e.g. the centre point)) which is movable relative to deformable material provided around it.

Preferably, the three or more notional axes are disposed relative to one another so that they pass through the vertices of an imaginary polyhedron whose centroid is located at the centre point and which has at least two-fold symmetry about three perpendicular axes. For example, if the polyhedron was a regular octahedron centred on the centre point, there would be three mutually perpendicular axis with their origin at the centre point (i.e. a three dimensional Cartesian coordinate space).

Preferably, the sensor includes a casing which encloses the core. The input force means may allow the core to be urged and/or twisted relative to the casing. The deformable material is preferably sandwiched between the core and casing. It may be fixed to one or both of the core and the casing such that the relative urging or twisting causes force to be applied to the deformable material. Deformable material may be present on both sides of the core; the opposed parts of deformable material experience complementary (i.e. opposite) forces; these forces lead to current signals that can be compared to indicate a force in a particular direction.

Parts of the deformable material can be constrained in at least one dimension by the casing. These parts can be free to move in other dimensions. Preferably, a current path flows along the dimension in which the deformable material is constrained. Thus, the deformable material is sensitive to force or resolved components of force in this dimension only.

The deformable material may comprise separate elements positioned around the core. Each element may be constrained in a dimension corresponding to one of the notional axes.

Each element may have two current paths passing through it. Preferably, the current paths run in the same direction. Preferably, this direction is the same as the constraining dimension. The current paths may be defined by positioning two electrodes on opposite exterior sides of the element. The electrodes may actually be barriers which constrain the deformable material. If the current paths emanate from the interior of the deformable element, the state of the deformable material (e.g. squashed) along each current path may be different. Thus, by comparing the currents along these paths, the site of a force along the direction of the current path can be determined. Positioning elements of this kind at different orientations can allow forces in three dimensions to be measured.

In a further preferred arrangement, the elements may be arranged in complementary pairs on opposite sides on the core. Each element of the complementary pair may detect force in the same direction, e.g. they may be physically constrained in the same direction as the current path that flows through them.

However, here the output of the complementary pairs can be compared to indicate a rotational force. For example, one of the complementary elements may indicate that the force is applied in a first direction, whereas the other may indicate that a force is applied in a second direction opposite to the first direction. In total, the detected linear force might be zero, but the detected current would indicate that a torque was being applied about an axis through the core perpendicular to a plane containing the detected current paths.

An alternative explanation for the invention is as follows. The sensor is arranged essentially to detect the movement of a virtual object floating in virtual, zero gravity, 3D space. If a force is applied at a point on the object's surface perpendicular to that surface, the object would move and/or rotate in space. If only a positive force (i.e. a push and not a pull) could be applied, then a minimum of 12 different points are required around the object at which to apply a force in order to create all possible movements and/or rotations. If the geometry of the object is known, the position of the points of force and the magnitude of the forces can be made to determine the movement and/or rotation of the object. There are however certain shapes of objects which will not work very well. These are shapes with circular curved surfaces around the centroid e.g. sphere or cylinder. This causes problems because if the force is always applied perpendicular to the surface you can never achieve a rotational force. Looked at in this light, the present invention can be expressed in a second aspect as a sensor for detecting input force and/or torque, the sensor including: a central polyhedral block; a casing enclosing said block, said casing and said block being moveable relative to one another by said input force and/or torque; deformable material located between the casing and the block such that relative movement of said block and casing will cause deformation of said deformable material, the deformable material having variable resistance depending on forces applied to it; and current detecting means to detect current flow through the deformable material at a plurality of faces of the polyhedral block, the current flow being substantially perpendicular to each of said plurality of faces of said polyhedral block.

Examples of the invention will now be described in detail with reference to the accompanying drawings in which.

Figure 1:
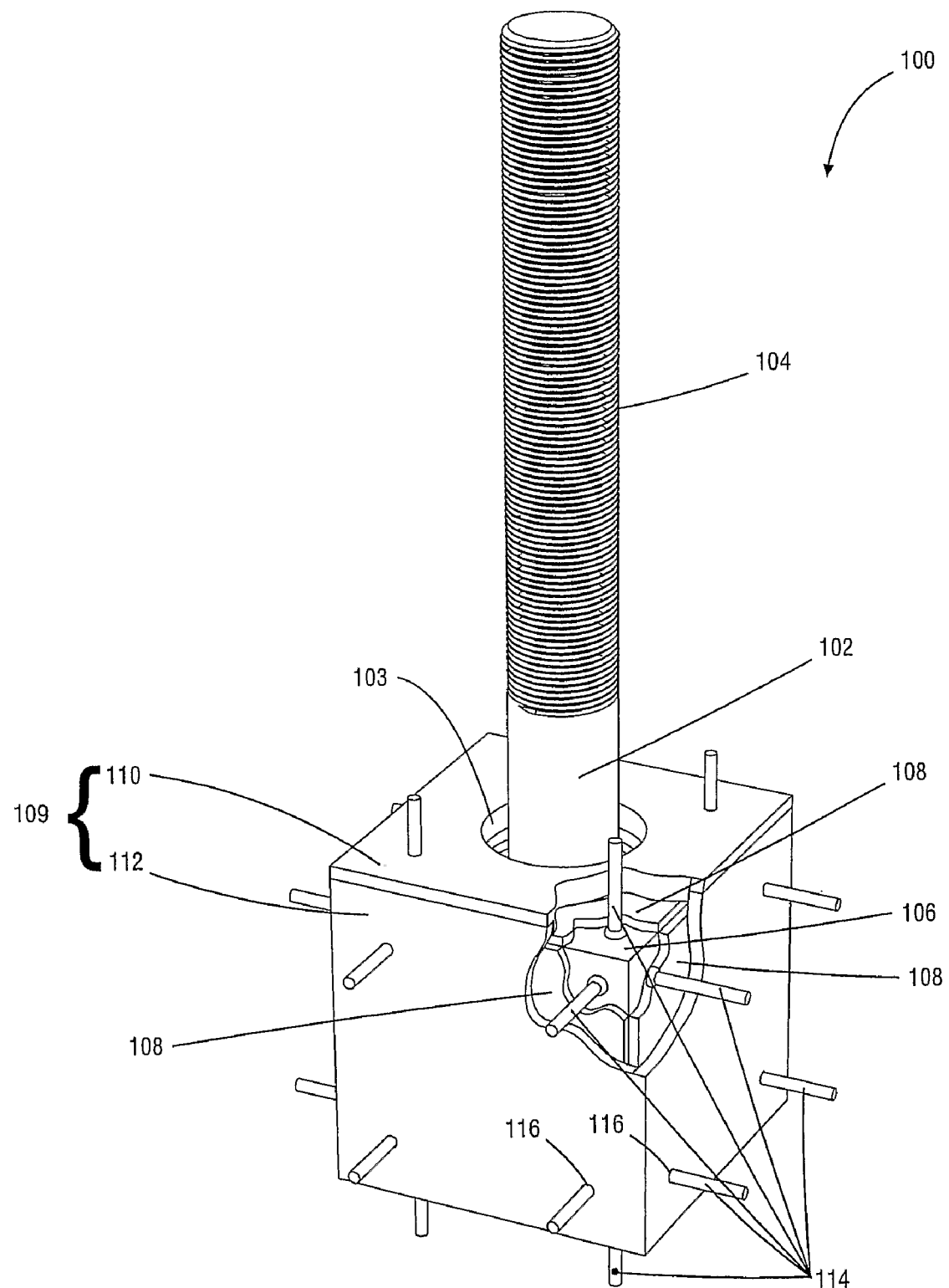
FIG. 1 shows a perspective view of a first embodiment of a six-axis sensor.

FIG. 1 shows a first embodiment of a six-axis sensor 100. The sensor 100 has an upright cylindrical input handle 102 with a threaded upper region 104 inserted through a hole 103 in a top layer 110 of an outer casing 109 and an intermediate layer 108 of a polymer composition whose properties are described more fully below. The handle 102 is secured to a central core 106. The core 106 is in the shape of a cube and is made of a conductive material, e.g. aluminium. The core 106 is supplied with current through the handle 102. The polymer composition changes its electrical resistance when pressure is applied to it.

A knob (not shown) may be screwed on to the threaded region 104 to provide grip e.g. for a user's hand. The cube-shaped core 106 is completely surrounded on five of its sides by the layer 108 of polymer, except for the hole 103.

The layer 108 of polymer is sandwiched (i.e. fits snugly) between the core 106 and the casing 109. The casing 109 comprises a cube-shaped box 112 for containing the cube-shaped core 106 with the layer 108 of polymer covering it. The casing 109 is made of an insulating material to ensure that the electrode pins 114 are isolated from one another. The layer 108 comprises six sheets of the polymer material secured e.g. using glue to each face of the cubic core 106. Alternatively, the polymer composition can be injected into the sensor to completely fill the cavity between the casing 109 and core 106. When injection is used, glue is not required. The polymer layer 108 is elastically deformable so that movement of the core 106 relative to the casing 109 causes distortion in the polymer layer 108. Electrode pins 114 are positioned on each face of the casing at an equal distance from each corner, making twenty-four electrode pins 114 in total. Each electrode pin 114 extends through a respective hole 116 in the casing and contacts the surface of the polymer layer 108. The width of the core 106 plus the polymer sheets of layer 108 is equal to the distance between the lower faces of opposite electrode pins 114. Thus, the core 106 is securely retained in a central position relative to the casing. Current may flow from the core 106 through the polymer layer 108 to the electrode pins 114. The size of the current through each electrode can be detected. Typically, analogue to digital conversion is used to derive a digital multi-bit output, suitable for a computer or digital electronic interface from a variable force transducer with an analogue output.

Figure 11:
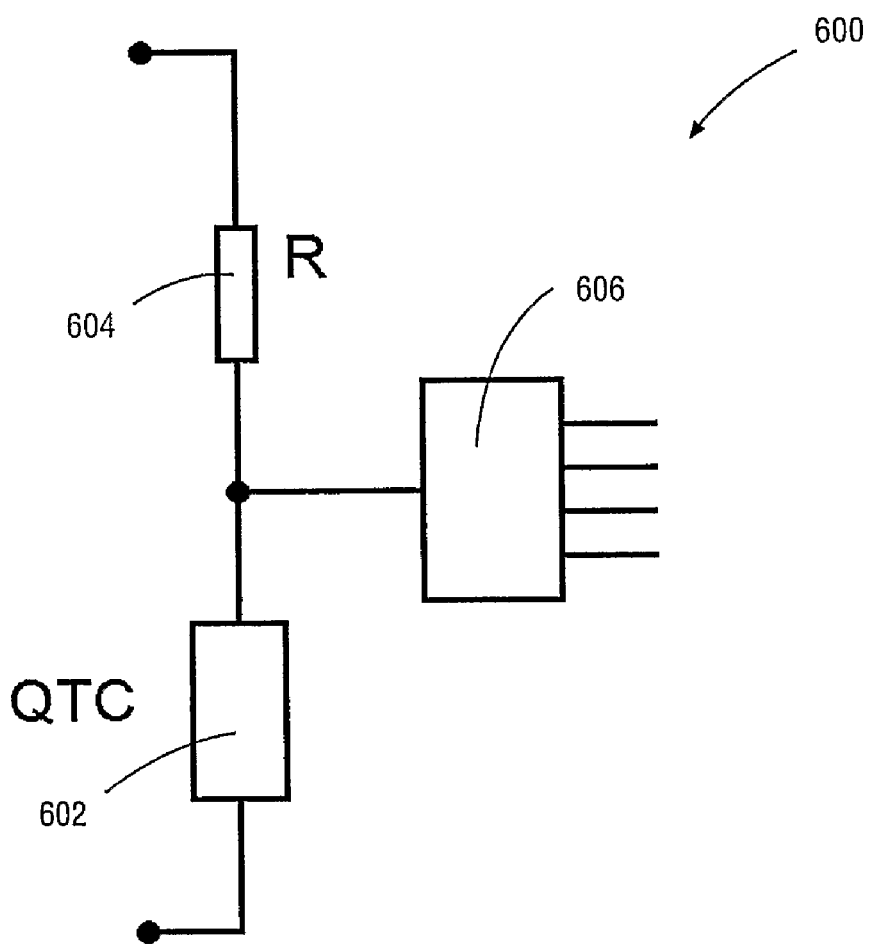
FIG. 11 shows a schematic circuit diagram of the conversion of detected current to output signals.

FIG. 11 illustrates a schematic circuit 600 which shows a variable resistance QTC element 602 connected in series with a fixed resistor R 604. The voltage apparent at the central node is monitored by the analogue to digital (A/D) converter 606 which presents the corresponding digital equivalent on its output.

In selecting an A/D converter attention needs to be paid to the accuracy required.

For many applications 8 bit output is sufficient, i.e. a resolution of 256 output levels over the entire input voltage range. However if higher accuracy on the output is required across the whole of the voltage input range, 10 bit or 12 bit resolution is preferred.

In order to avoid temperature drift, it is desirable to use a reference voltage derived from the A/D converter to drive the circuit.

In FIG. 1, four electrodes 114 are positioned on each face of the cube-shaped casing 109, one towards each corner. The currents through selected combination of electrodes 114 are compared to give an indication of applied force or torque.

Figure 1A:
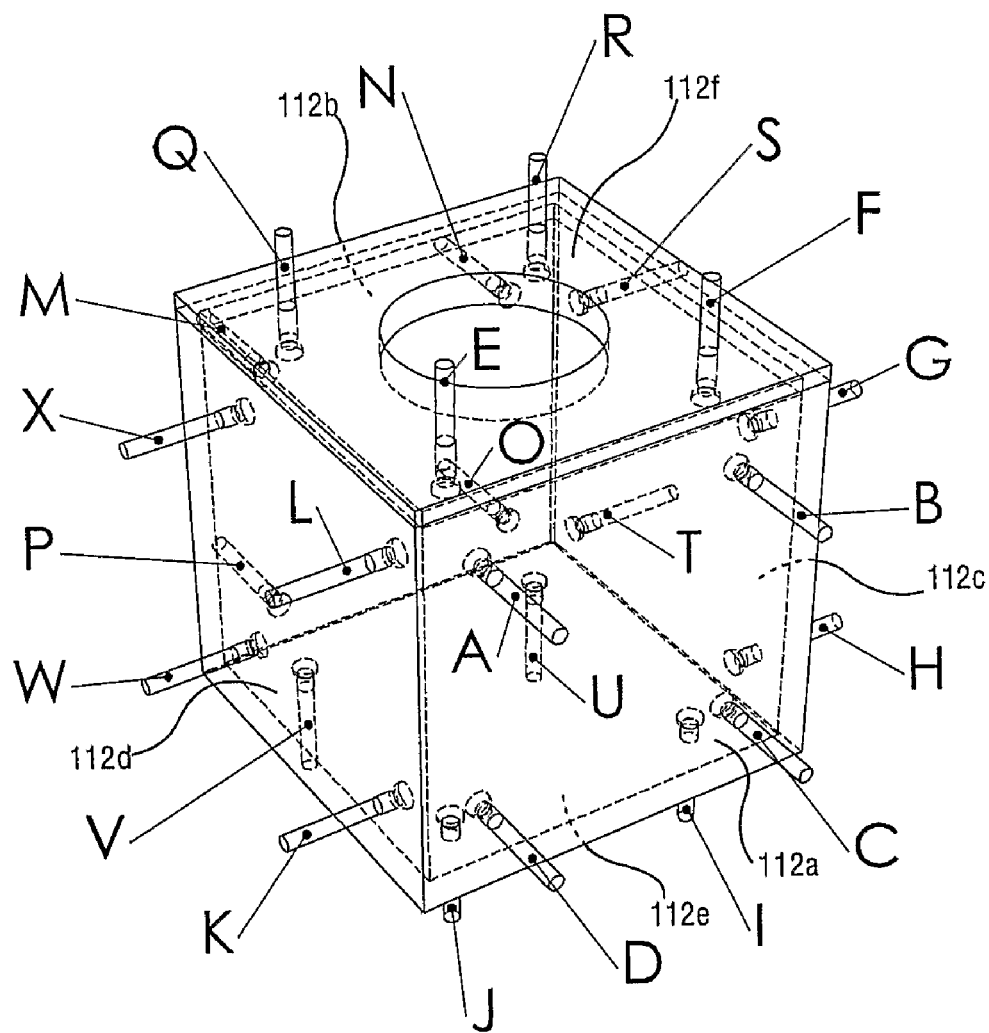
FIG. 1a shows a view of the electrode configuration of the sensor of FIG. 1.

FIG. 1a shows the casing 109 of the sensor 100 of FIG. 1 with all twenty-four electrode pins 114. The electrodes 114 are labelled A-X: electrodes A, B, C, D are located at the corners of a first side surface 112a; electrodes M, N, O, P are located at the corners of the side surface 112b opposite the first side surface 112a; electrodes G, H, S, T are located at the corners of a second side surface 112c neighbouring the first side surface 112a; electrodes K, L, W, X are located at the corners of the side surface 112d opposite the second side surface 112c; electrodes I, J, U, V are located at the corners of the bottom surface 112e; and electrodes E, F, R, Q are located at the corners of the top surface 112f, through which the input handle 102 extends.

When the casing 109 is fixed and a force or torque is applied to the input handle 102 in any of the six possible degrees of freedom, a resultant force is applied to the polymer layer 108 by a number of the electrode pins 114. As a result, the polymer layer between the core 106 and one or more of the electrode pins 114 is compressed. Current therefore flows between those pins and the central block. By measuring the value of this current, the value of the resultant forces can be calculated and thereby the value of the force or torques applied to the bar in each of the six-axis degrees of freedom can be independently calculated.

In the sensor 100 of FIG. 1, the six-axis components can be calculated by determining the resultant current flowing through equal and opposite electrodes i.e. translational forces along the axes x, y, z are calculated by subtracting the total of the reading on all the electrodes on one face from the sum of the reading on all the electrodes on the opposite face. Rotational forces about axes rx, ry and rz are calculated from the sum of the readings of electrodes on one leading edge around the cube in the direction of rotation minus the sum of the readings of electrodes on the opposite leading edge.

By representing the current value detected by the electrodes 114 by their letters, the following table lists the combinations of electrodes that are compared to detect input force/torque with six degrees of freedom.

TABLE 1

Calculation of currents representative of force/torque for the sensor shown in FIG. 1

| Degree of freedom | Equation |
| --- | --- |
| Translational along x | (A + B + C + D) − (M + N + O + P) |
| Translational along y | (G + H + S + T) − (K + L + W + X) |
| Translational along z | (E + F + Q + R) − (I + J + U + V) |
| Rotational about x | (J + V + L + X + F + R + H + T) − (I + U + G + S + E + Q + K + W) |
| Rotational about y | (A + B + I + J + O + P + Q + R) − (C + D + U + V + M + N + E + F) |
| Rotational about z | (A + D + G + H + N + O + W + X) − (B + C + K + L + M + P + S + T) |

The conductive polymer composition is made of at least one electrically conductive filler dispersed within and encapsulated by a non-conductive elastomer. The nature and concentration of the filler is chosen so that the resistance of the material varies proportionally in response to stresses or strains applied to it. Therefore, when a voltage is applied across a section of the material whilst it is in a neutral state, a current may pass. When force is applied to the material to create stresses between the points at which the voltage is applied, the current passing between these points will vary. The amount of current which passes will be relative to the amount of stress in the material, which is in turn proportional to the force or forces applied. The sensitivity of the material can be varied by altering the mix of the material during manufacture, or by altering the electrical parameters used to read it and can give a range of response as wide as requiring a hammer blow or the touch of a feather. Any material that is pressure-sensitive in a similar way may be used in the present invention. The material preferred by the inventors is QTC (Quantum Tunnelling Composite), manufactured by Peratech Limited.

Figure 2:
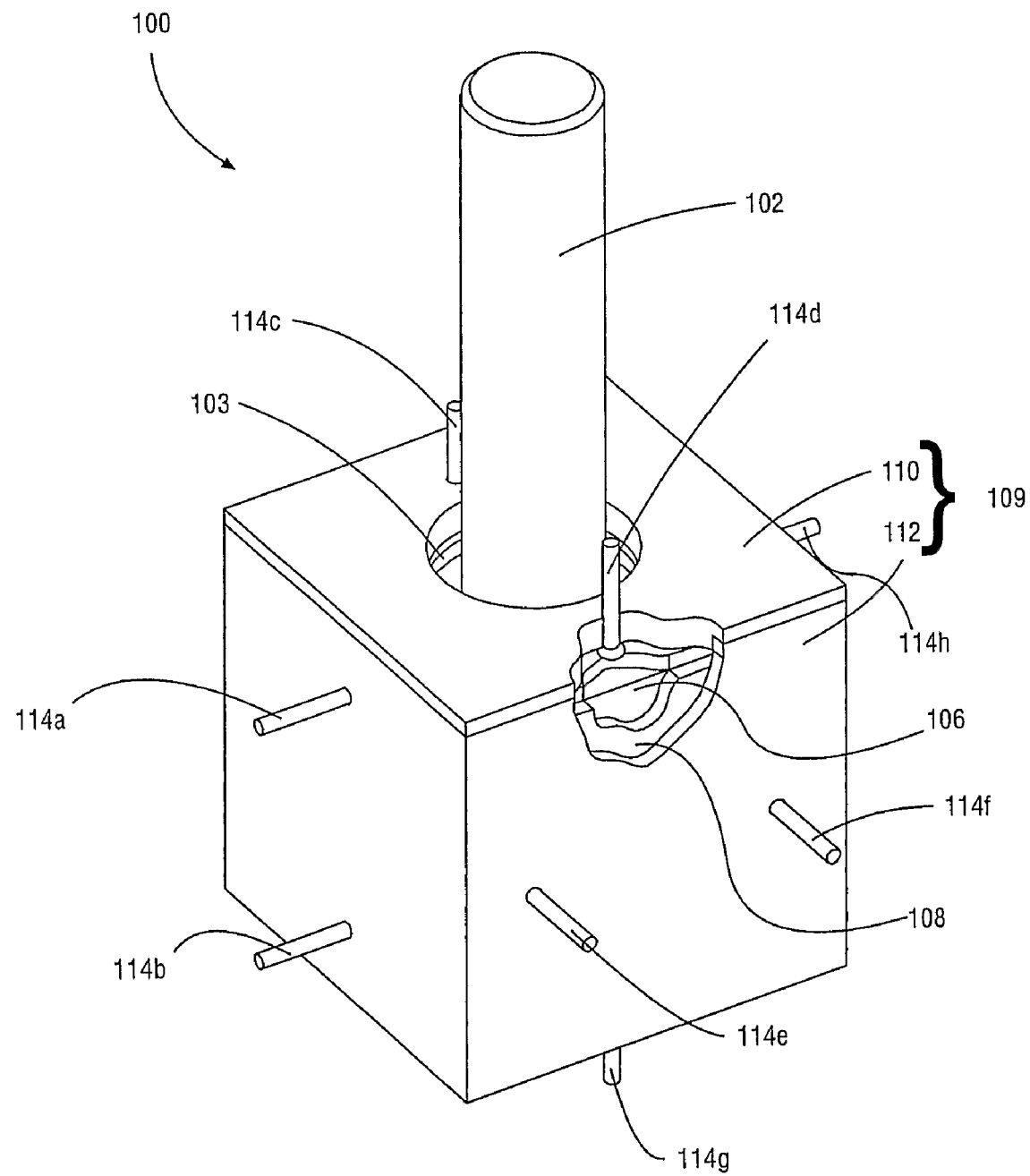
FIG. 2 shows an alternative arrangement of electrodes on the sensor shown in FIG. 1.

FIG. 2 shows a variation of the first embodiment of the six-axis sensor which is similar to that shown in FIG. 1; common elements are labelled with the same number. In this case, there are only twelve electrode pins 114. The pins 114 are arranged in opposing pairs on each of the three Cartesian coordinate planes xy, xz, yz, which have the centre of the casing 109 as their origin. This is shown in detail in FIG. 2a. The electrode pins 114 are therefore not located at the corners in this embodiment. Instead, a pair of electrode pins 114 on each face defines a line along that face which lies on one of the three Cartesian coordinate planes mentioned above. Each pair lies directly opposite and on the same plane as another pair. All three Cartesian planes are represented.

Figure 2A:
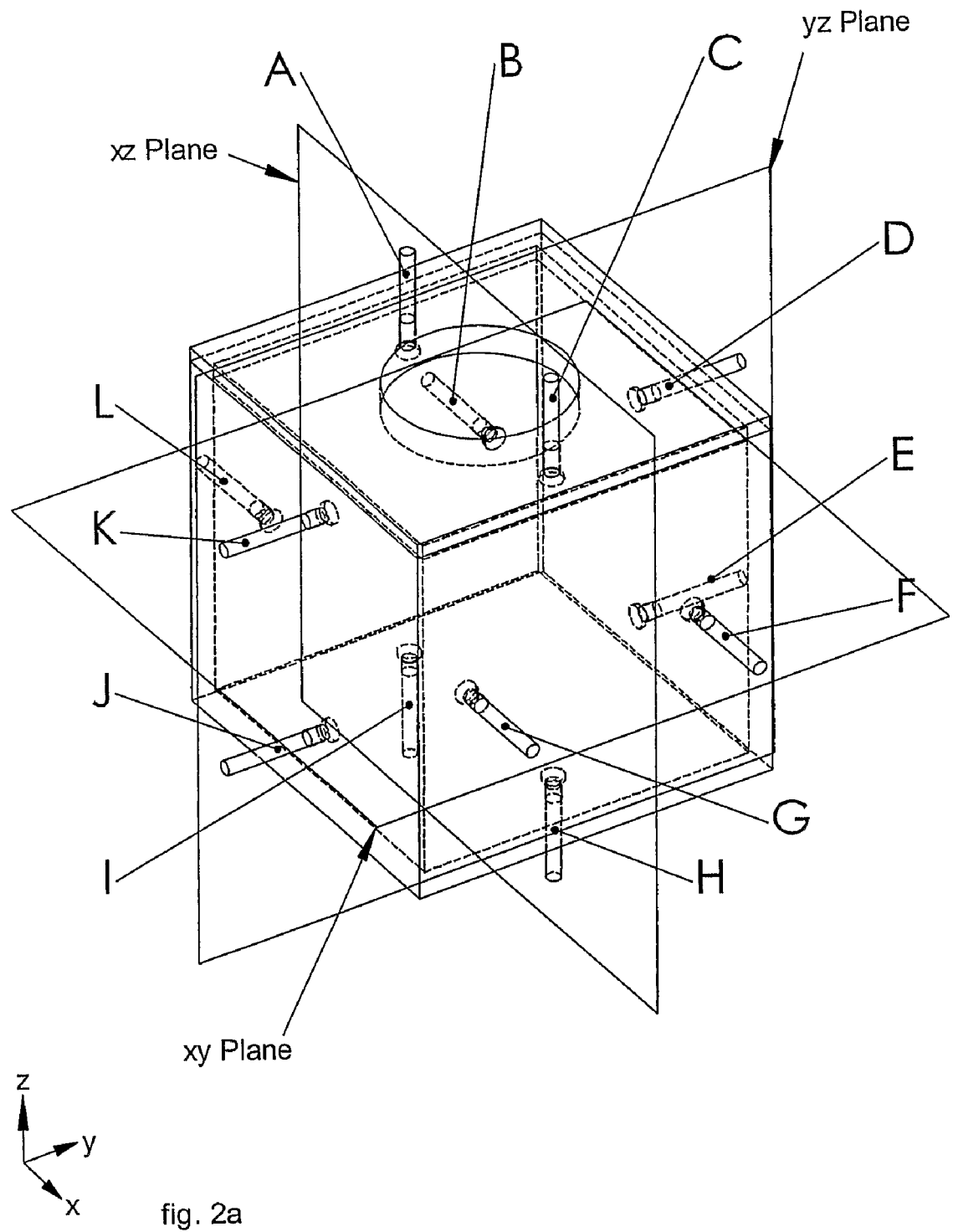
FIG. 2a shows a view of the electrode configuration of the sensor of FIG. 2.

The operation of the sensor is similar to the sensor of FIG. 1 in that the current flowing through different combinations of electrodes are compared. In FIG. 2a, electrodes A, C, I, H are in the xz plane, A equally opposing I, and C equally opposing H. Electrodes D, E, J and K are all in the yz plane, D equally opposing K, and E equally opposing J. Electrodes L, B, F and G are all in the xy plane, B equally opposing F, and L equally opposing G. Table 2 shows the equations for calculating the applied forces and/or torques.

TABLE 2

Calculation of current representative of force/torque

| Degree of freedom | Equation |
| --- | --- |
| Translational along x | (F + G) − (B + L) |
| Translational along y | (D + E) − (J + K) |
| Translational along z | (A + C) − (H + I) |
| Rotational about x | (E + K) − (D + J) |
| Rotational about y | (A + H) − (C + I) |
| Rotational about z | (B + G) − (F + L) |

Figure 3:
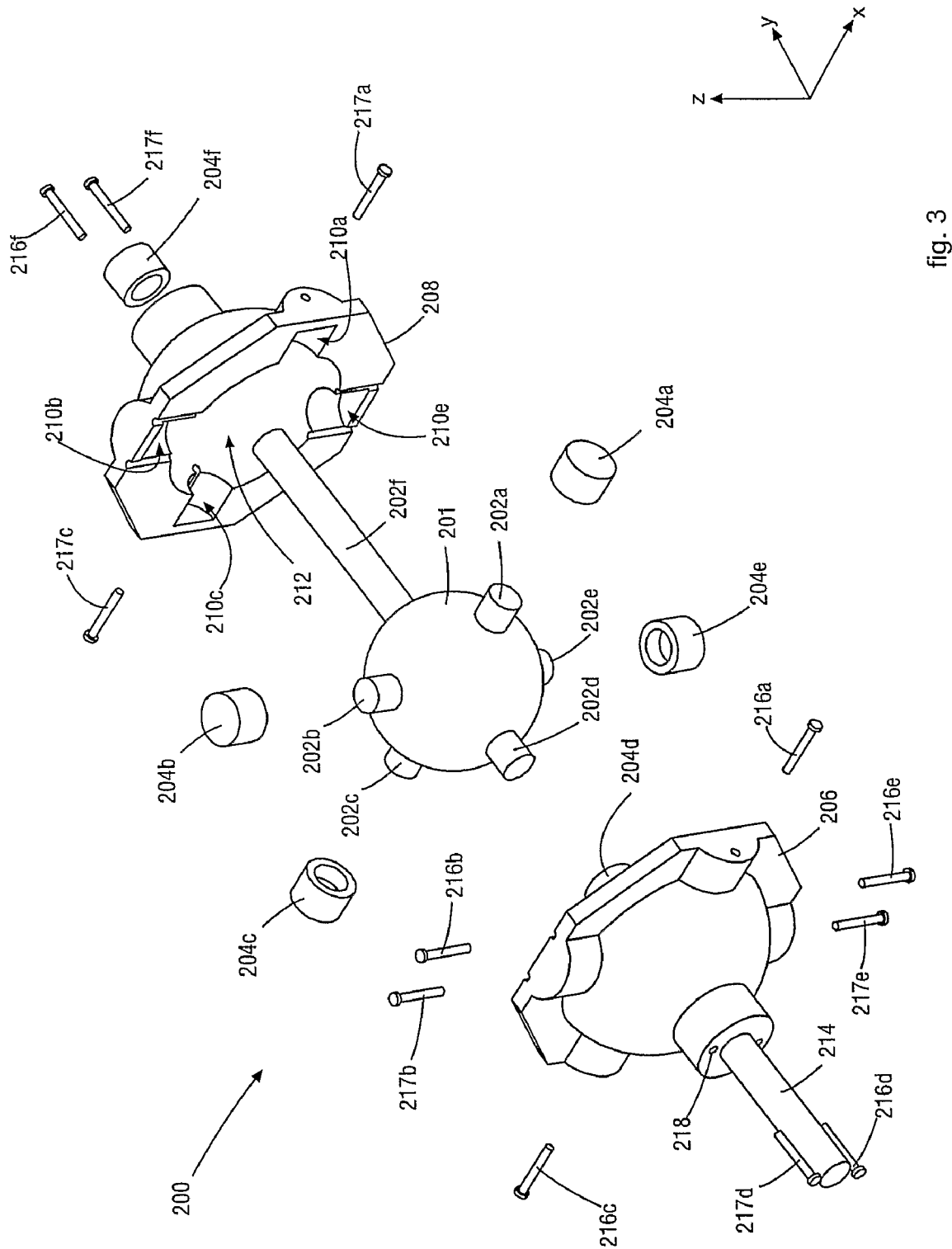
FIG. 3 shows an exploded perspective view of a second embodiment of a six-axis sensor according to the invention.

FIG. 3 shows a sensor 200 which is a second embodiment of the invention. Sensor 200 works on the same principle shown in FIG. 2a. The sensor 200 has a spherical core 201 with six protrusions 202 extending out of it. The protrusions 202 extend in three mutually perpendicular directions, i.e. in the positive and negative directions of three Cartesian coordinate axes. One of the protrusions is longer than the others, and acts as an input handle 202f for applying force and/or torque to the sensor.

The core 201 is surrounded by a casing which comprises a first and second casing parts 206, 208 which are securable together. The second casing 208 includes an aperture (not shown) through which the longer protrusion 202f extends. The casing parts 206, 208 also define recesses 210 for containing the other protrusions 202.

To detect relative input force/torque between the core 201 and casing, each of the protrusions 202 has a layer 204 of polymer coating at least part of its side surfaces. A ring 204 of polymer material is threaded on to the longer protrusion 202f, whereas the other protrusions 202a-e are each covered by a respective cap 204a-e of polymer. The recesses 210 are shaped so that the polymer-covered protrusions are securely held, i.e. the core 201 is securely held in the casing. Protrusions 202 are made of conductive material (e.g. aluminium) and act as a current source. The protrusions 202 are held at a predetermined voltage chosen according to the electronics used (e.g. 1.5V). The voltage may be applied from an external source (e.g. a computer via a serial connection or USB port) or an internal source (e.g. battery). The exterior surface of the casing has holes 218 located in certain positions to allow electrode pins 216, 217 to be inserted into contact with the polymer material 204 covering the protrusions 202. Each protrusion 202 has a pair of electrode pins 216, 217 associated with it. The electrode pins 216, 217 are inserted on opposite sides of each protrusion 202. Thus, if a force pushes the core 201 relative to the casing, one or other of the electrode pins 216, 217 will exert a compressing force on the polymer layer 204, whereby current will flow along a path from the protrusion 202 to the electrode pin 216, 217. The size of this current can be measured.

The electrode pin pairs are arranged in a similar configuration to FIG. 2a. In other words, each pair lies on one of three Cartesian coordinate planes which have the centre of the casing as their origin. Each pair has a corresponding pair that lies directly opposite them on the same plane, and all three planes are represented.

Thus, electrode pins 216a, 217a, 216c, 217c lie on the xy plane; electrode pins 216d, 217d, 216f, 217f lie on the yz plane; and electrode pins 216b, 217b, 216e, 217e lie on the xz plane. The equations for calculation of applied forces/torques with six degrees of freedom are similar to those shown in Table 2.

Figure 4:
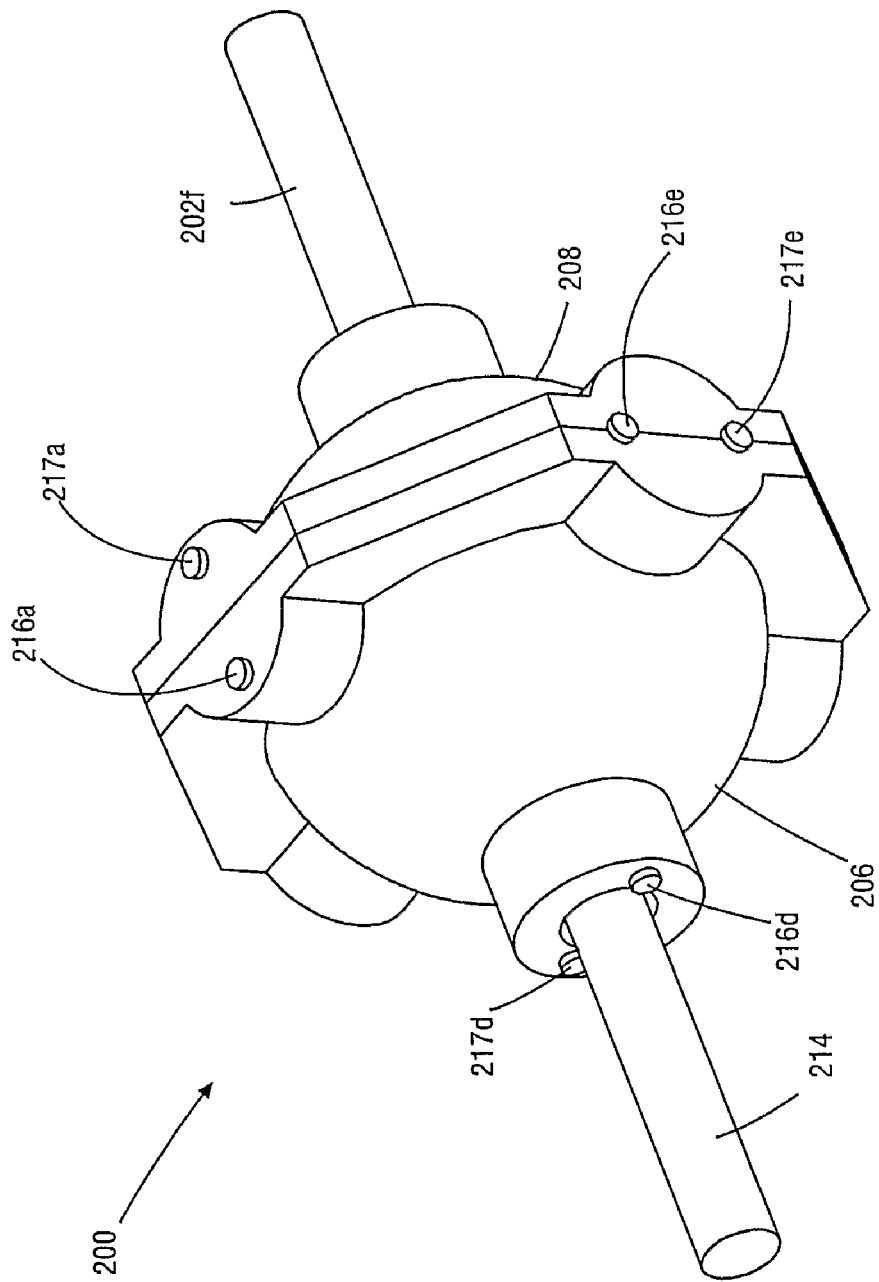
FIG. 4 shows a perspective view of an assembled version of the sensor shown in FIG. 3.

FIG. 4 shows the assembled sensor 200 with the casing parts 206, 208 secured together. The securing can be achieved using any known means, e.g. screws or glue. The electrode pins 216, 217 are inserted into their holes 218. Input handle 202f protrudes out of one side of the casing. Support handle 214 protrudes out of the opposite side of the casing. Input handle 202f is attached to the core 201, whereas support handle 214 is attached to the casing. Relative force and/or torque between the handles 202f, 214 will cause relative force and/or torque between the core 201 and casing, which can be detected.

Figure 5:
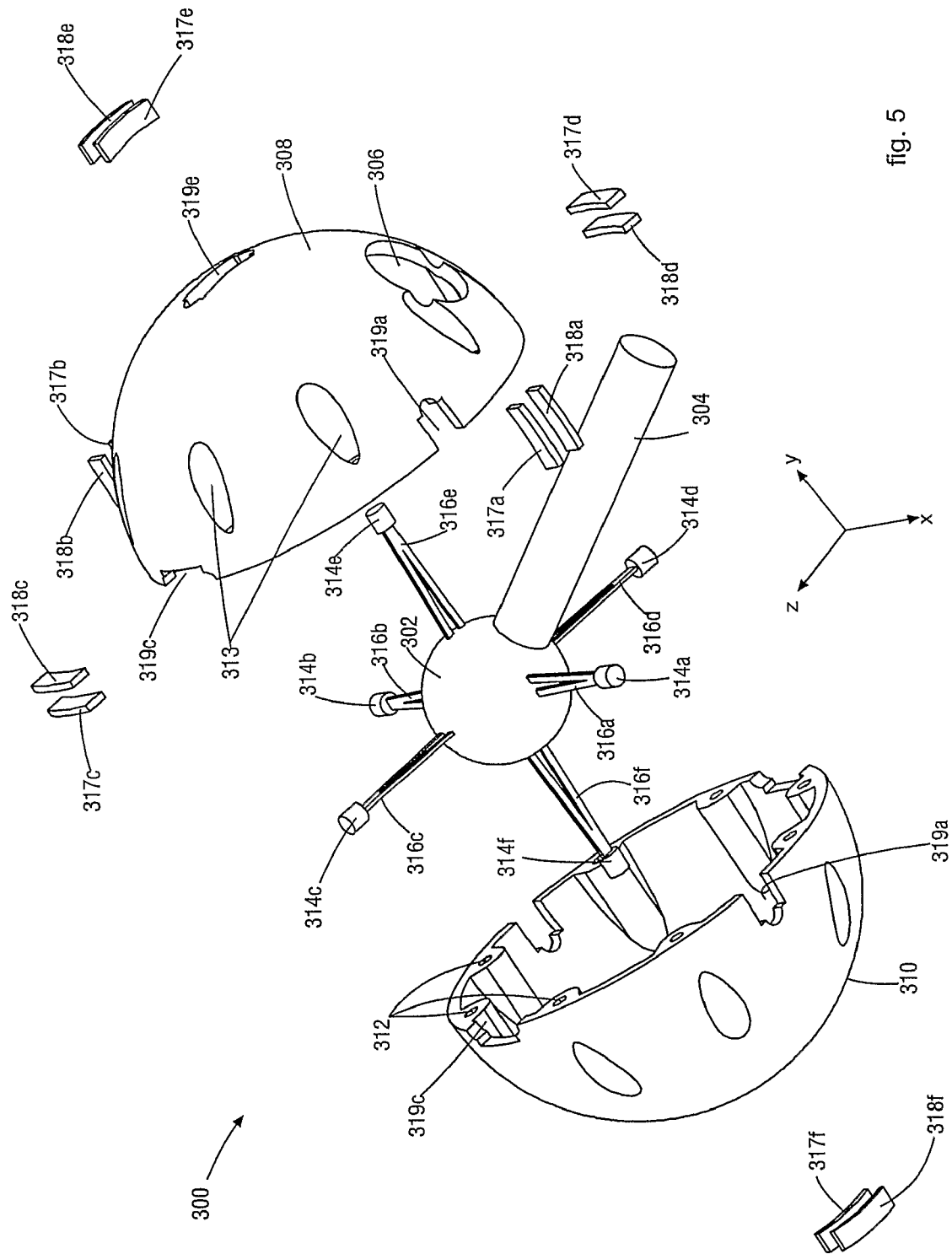
FIG. 5 shows an exploded perspective view of a third embodiment of a six-axis sensor according to the invention.
Figure 6:
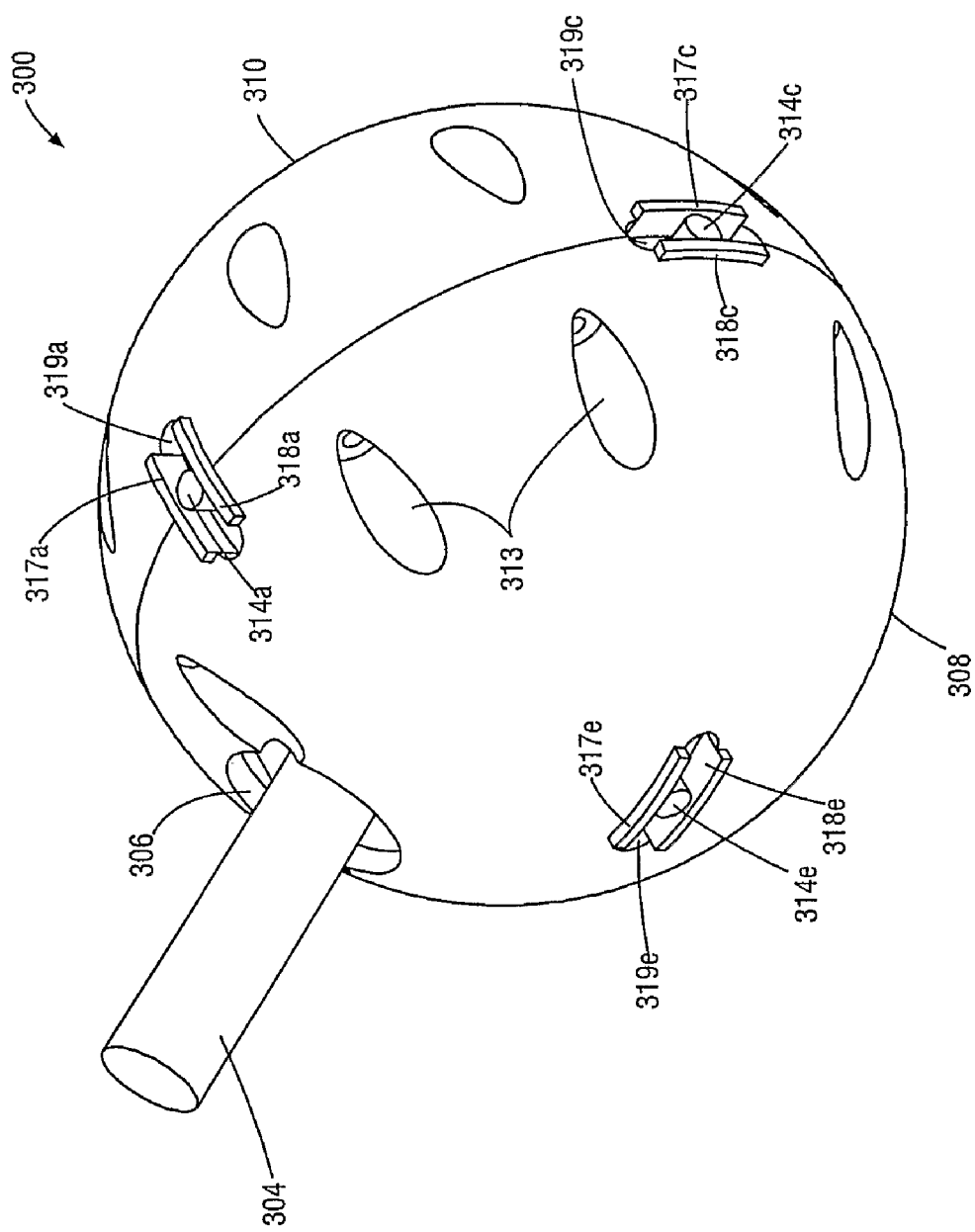
FIG. 6 shows the perspective view of an assembled version of the sensor shown in FIG. 5.

FIGS. 5 and 6 show a sensor 300 which is a third embodiment of the invention. Sensor 300 is based on the sensor 200 shown in FIG. 3. The sensor 300 has a spherical core 302 which is encapsulated by a casing made up of casing parts 308, 310 which are securable together by e.g. screws which pass through recesses 313 into holes 312. The core 302 has protrusions 316 extending from it in three mutually perpendicular axes as in FIG. 3. Caps 314 of polymer material are secured to the end of each protrusion 316. In this arrangement, the protrusions 316 are generally V-shaped prongs which are made of resilient material e.g. spring steel, to be deformable to some extent to allow a degree of movement/displacement of the core 302 with respect to the casing. Relative movement in the previous sensors was minimal or non-existent. As the protrusions are not rigid, a separate rigid input handle 304 extends from the core 302 out through a hole 306 in the casing. As with all the previous sensors, the input handle 304 is rigidly attached to the core 302 to apply force and/or torque to the core 302 relative to the casing.

The casing 308, 310 has elongate slots 319 in this exterior surface for receiving the polymer caps 314. Each slot 319 has each of its elongate sides lined by an electrode 317, 318. Each polymer cap 314 is therefore sandwiched between an electrode pair 317, 318 in a slot 319. The caps 314 are therefore free to move along the longitudinal direction of the slots 319, but are constrained by the electrodes 317, 318 in the lateral direction of the slot 319.

The electrode pairs 317, 318 are arranged in a similar configuration to FIG. 2a. In this case, each electrode pair 317, 318 constrains the movement of the polymer cap 314 enclosed by it in one of three mutually perpendicular planes whose origin lies at the centre of the casing. Each part 317, 318 has a complementary pair 317, 318 that lies directly opposite it and constrains motion of the cap 314 in the same plane. All three planes are represented.

Thus, electrodes 317a, 318a, 317b, 318b constrain polymer caps 314a, 314b in the xz plane; electrodes 317c, 318c, 317d, 318d constrain polymer caps 314c, 314d in the yz plane; and electrodes 317e, 318e, 317f, 318f constrain polymer caps 314e, 314f in the xy plane. When force and/or torque is applied to the sensor, the polymer caps 314 are squashed against electrodes 317, 318, thereby causing the polymer caps 314 to deform. A potential difference applied between the protrusions 316 and electrodes 317, 318 will cause a current to flow through the polymer caps through a compressed region. This current is detected and used to calculate the applied force. The equations used to calculate the forces it the sensor 300 shown in FIGS. 5 and 6 are similar to those described in Table 2.

FIG. 6 shows the assembled sensor of FIG. 5. The hole 306 leaves a clearance area around the input handle 304 to allow the handle 304 to move relative to the casing.

Figure 7:
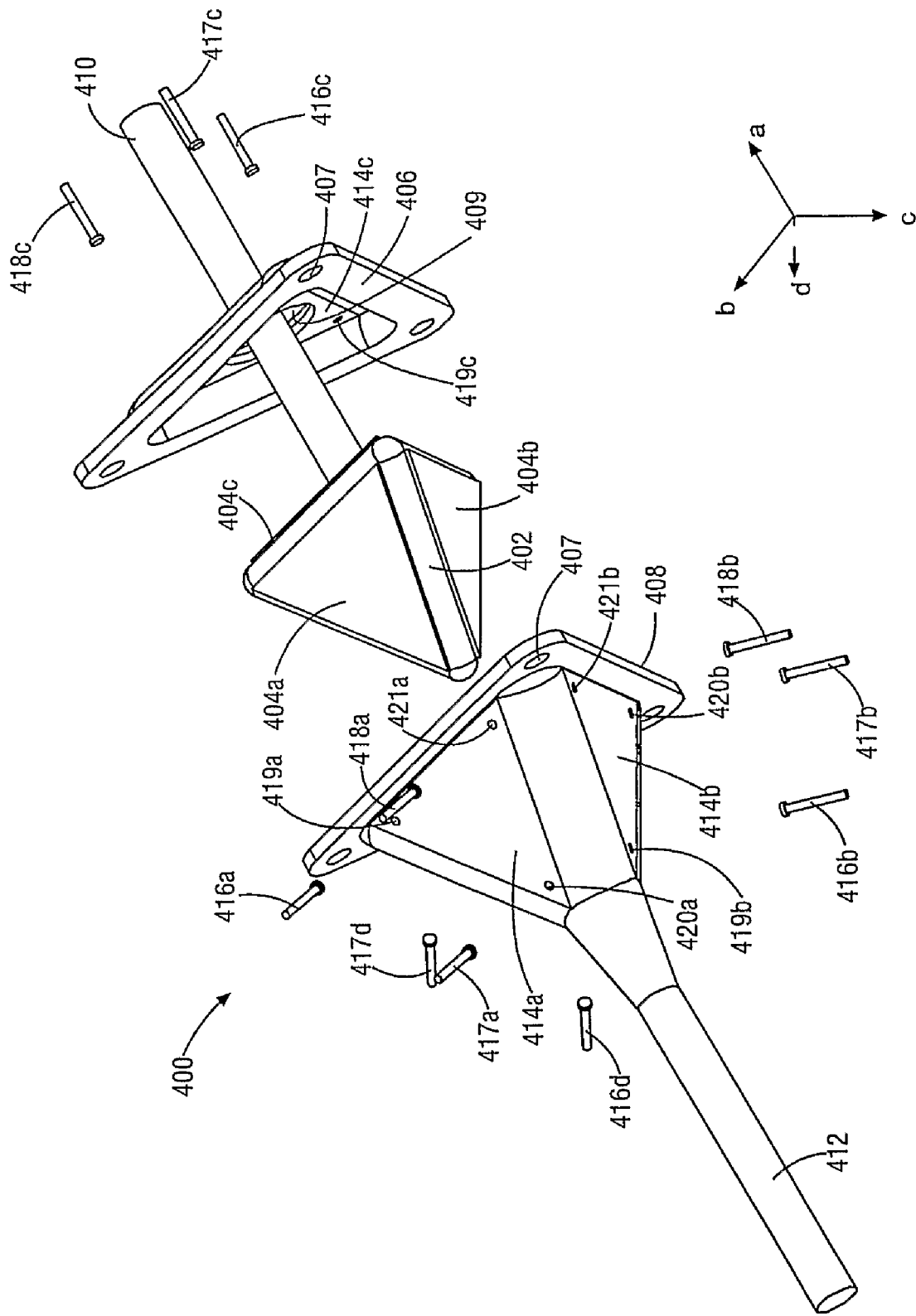
FIG. 7 shows an exploded perspective view of a fourth embodiment of a six-axis sensor according to the invention.

FIG. 7 shows a sensor 400 which is a fourth embodiment of the invention. This sensor 400 has a tetrahedral configuration to detect force and/or torque with six degrees of freedom. The sensor 400 detects force along four axes a, b, c, d and converts this into force and/or torque with six degrees of freedom. The four axes have a mutual origin in the centre of a tetrahedral core 402 and extent in the positive direction only through the centre of each triangular plane face 404 of the tetrahedron.

The core 402 has a sheet of polymer material attached to (e.g. using glue) or injected between each of its plane faces 404. Similarly to the sensor shown in FIG. 1, the core 402 is encapsulated in a casing. The casing comprises two casing parts 406, 408 that are securable together using bolt holes 407. One face 404c of the core 402 has an input handle 410 rigidly attached to it. The input handle 410 extends out through a hole 409 in a casing part 406. The input handle 410 allows relative force and/or torque to be provided between the core 402 and the casing. The casing has a handle 412 rigidly attached to it such that relative force/torque between the handles 410, 412 is detected by the sensor.

The casing includes four triangular surfaces 414 for enclosing the core 402 with the sheets of polymer material attached to it. Each surface 414 has holes 419, 420, 421 at each of its corners, through which electrode pins 416, 417, 418 are respectively inserted to contact the sheet of polymer material. The core 402 is therefore securely held by the electrode pins 416, 417, 418. Relative force/torque between the core and casing will cause the electrode pins 416, 417, 418 to deform (compress) the polymer sheet. A potential difference is applied between the core 402 and electrode pins 416, 417, 418 so that current flows when compression of the polymer sheet occurs.

Figure 8:
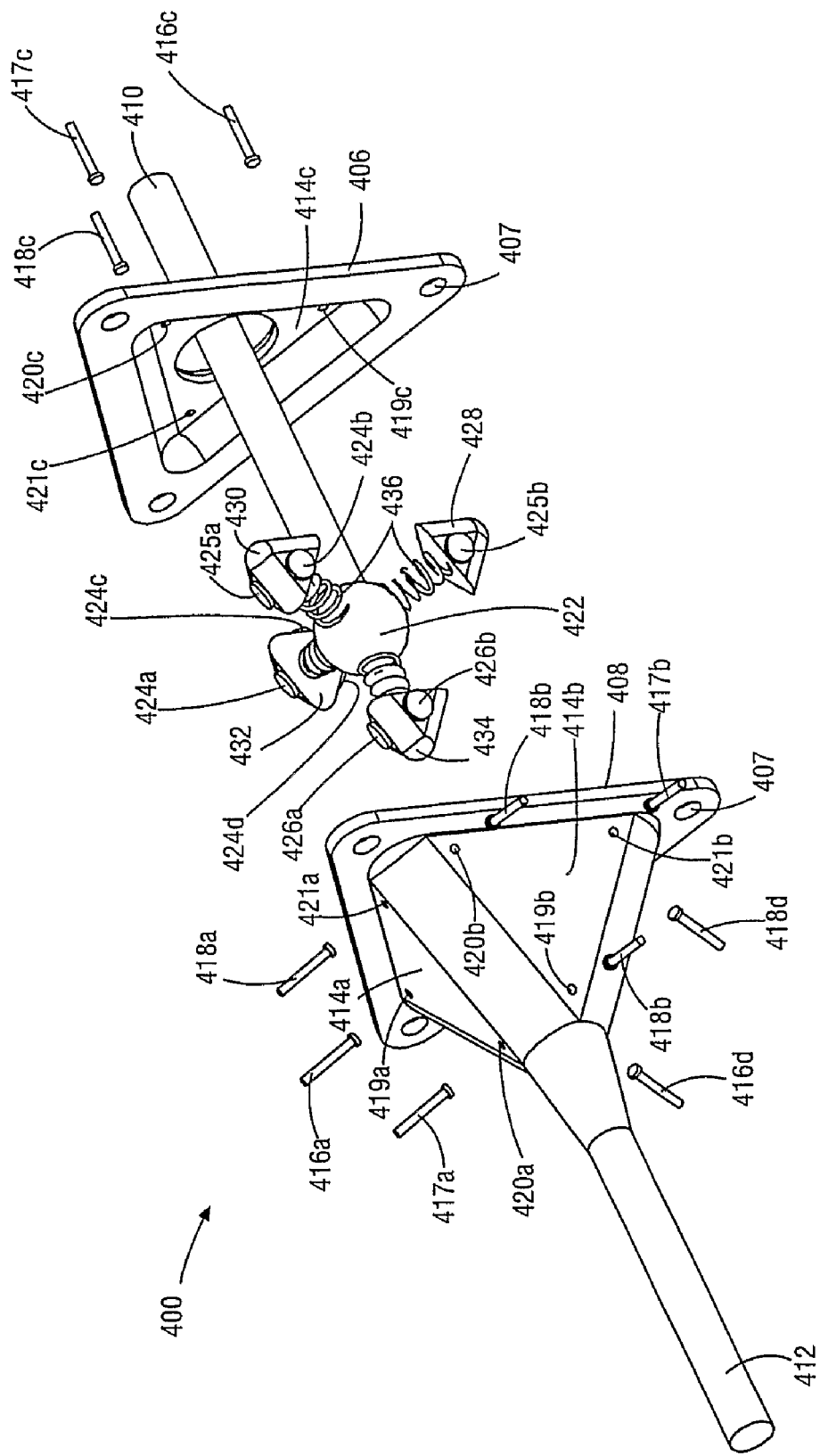
FIG. 8 shows an exploded perspective view of an alternative core piece of the sensor shown in FIG. 7.

FIG. 8 shows an alternative arrangement of sensor 400. Common parts are given the same reference number. The core 422 in this alternative is a sphere on to which tetrahedron-shaped protrusions 428, 430, 432, 434 are attached using resilient springs 436 which allow some relative movement between the core 422 and the protrusions. Each protrusion 428, 430, 432, 434 points towards a corner of the casing where three electrode pins are positioned. Each protrusion has three pads 424, 425, 426 of the polymer material for the electrode points to contact. The sensor 400 then works in the same way as the sensor shown in FIG. 7, except that is permits more relative movement/displacement between the handles 410, 412.

Figure 9:
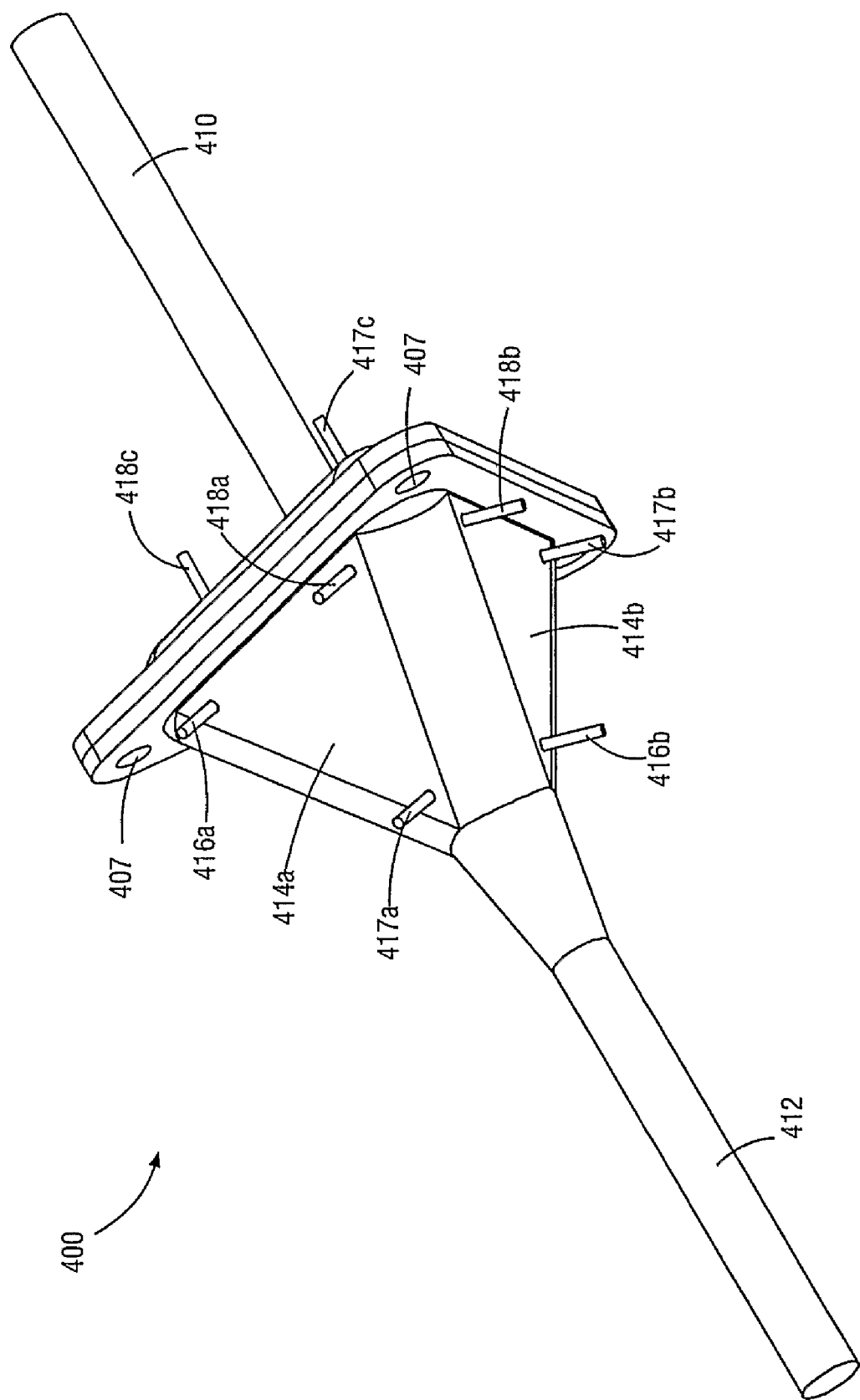
FIG. 9 shows a perspective view of an assembled version of the sensors shown in FIGS. 7 and 8.

FIG. 9 shows the assembled sensor 400 of FIGS. 7 and 8.

Figure 10:
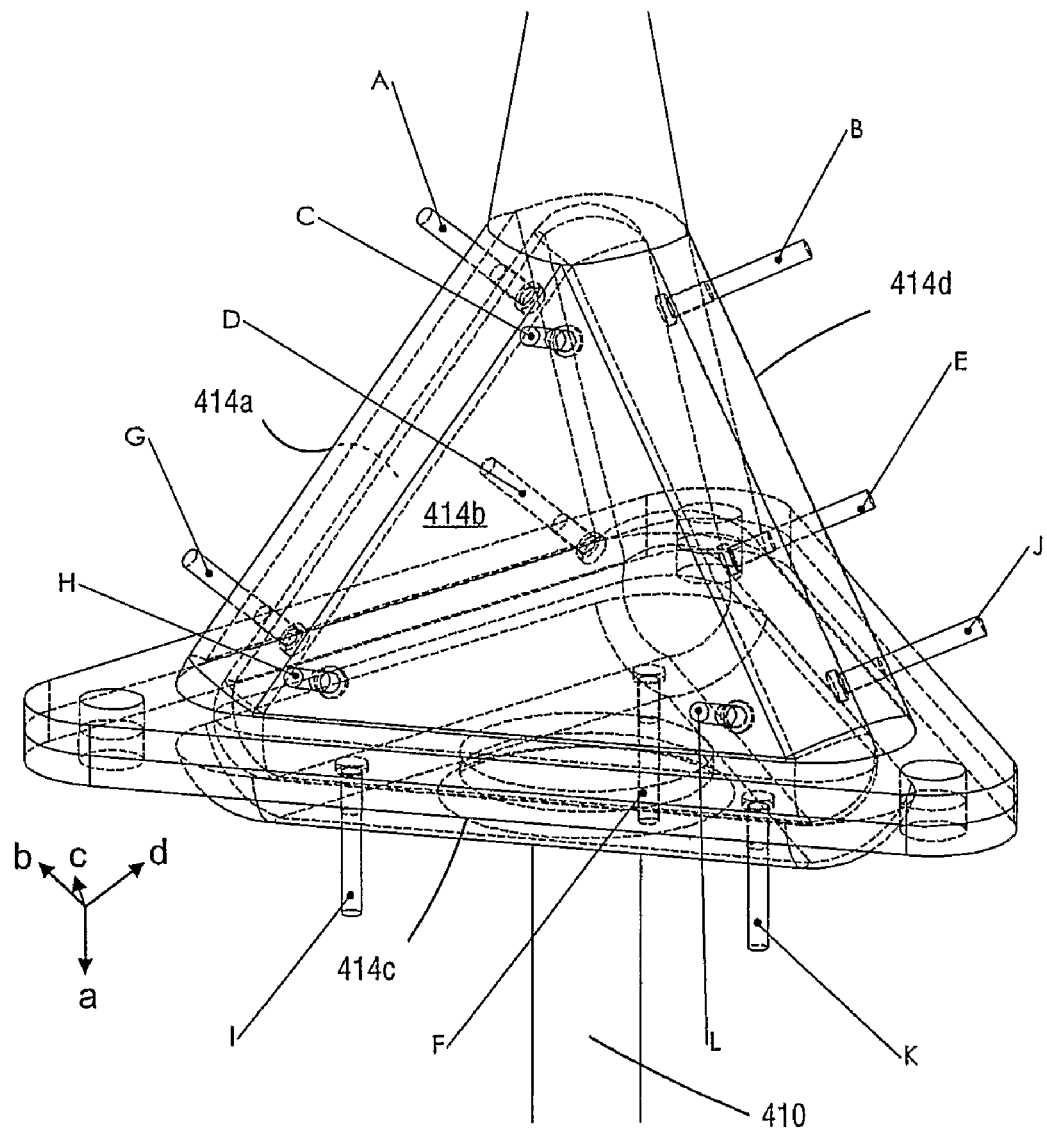
FIG. 10 shows a view of the electrode configuration of FIG. 9.

FIG. 10 shows the electrode configuration of the sensor of FIG. 9. The electrode pins are labelled A-L: electrodes F, I, K are located respectively at each corner of a first triangular surface 414c through which the input handle 410 extends; electrodes A, D, G are located respectively at each corner of a second triangular surface 414a; electrodes C, H, L are located respectively at each corner of a third triangular surface 414b; and electrodes B, E, J are located respectively at each corner of a fourth triangular surface 414d.

As before, relative movement of the core relative to the casing will cause some of the electrode pins to exert compressive force on the polymer material: current therefore flows from the core through the polymer material. The sensor detects current only where compression occurs.

The sensor is arranged to detect translational movement along and rotational movement about the four axes a, b, c, d. These types of movement can easily be translated into the six degrees of freedom associated with 3D Cartesian coordinates by known mathematical transformations.

By representing the current value detected by the electrodes by their letters as above, the following table lists the combinations of electrodes that are compared to detect input force along and/or about the four tetrahedral axes a, b, c, d.

| Degree of freedom | Equation |
| --- | --- |
| Translational along a | (F + I + K) − (A + B + C) |
| Translational along b | (A + D + G) − (J + K + L) |
| Translational along c | (C + H + L) − (D + E + F) |
| Translational along d | (B + E + J) − (G + H + I) |
| Rotational about a | (D + H + J) − (E + G + L) |
| Rotational about b | (B + F + H) − (C + E + I) |
| Rotational about c | (A + I + J) − (B + G + K) |
| Rotational about d | (A + F + L) − (C + D + K) |

The invention may include any variations, modifications or alternative applications of the above embodiment, as would be readily apparent to the skilled person without departing from the scope of the present invention in any of its aspects.

The invention claimed is:

1. A sensor for detecting input force and/or torque, the sensor including:
   a core having a central region;
   a deformable material having variable electrical resistance depending on forces applied to it positioned at least partially around the central region;
   input force means for transmitting to the deformable material applied force relative to the central region; and
   a plurality of electrodes positioned against the deformable material, each electrode being at one end of a respective current path, each current path being the shortest path of current flow from the core to the electrode conducted through the deformable material,
   wherein the plurality of electrodes include three electrodes whose respective current paths corresponds to the direction of three or more notional axes providing a three-dimensional coordinate space.

2. A sensor according to claim 1, wherein each current path is parallel or perpendicular to one of the three or more notional axes.

3. A sensor for detecting input force and/or torque, the sensor including:
   a core having a central region;
   a deformable material having variable resistance depending on forces applied to it positioned at least partially around the central region;
   input force means for transmitting to the deformable material applied force relative to the central region; and
   a plurality of electrodes positioned against the deformable material, each electrode being at one end of a current path, each current path being the shortest path of current flow from the core to the electrode through the deformable material,
   wherein, each current path corresponds to the direction of one of three or more notional axes providing a three-dimensional coordinate space, and
   wherein the three or more notional axes are disposed relative to one another such that they pass through the vertices of an imaginary polyhedron whose centroid is located in the central region, the imaginary polyhedron having at least two-fold symmetry about three perpendicular axes.

4. A sensor according to claim 1, wherein the notional axes are three mutually perpendicular axes defining three-dimensional Cartesian space.

5. A sensor according to claim 1, wherein the deformable material is constrained in at least one dimension by a casing and the input force means is arranged to urge the deformable material relative the casing, whereby the casing exerts force on the deformable material.

6. A sensor according to claim 5, wherein the casing encapsulates the core, and the deformable material is located between the casing and the core.

7. A sensor according to claim 1, wherein the deformable material is provided in a plurality of packets surrounding the core, each packet being associated with a pair of electrodes.

8. A sensor according to claim 7, wherein the packets are spatially separated from one another.

9. A sensor for detecting input force and/or torque, the sensor including:
   a central polyhedral block;
   a casing enclosing said block, said casing and said block being moveable relative to one another by said input force and/or torque;
   deformable material located between the casing and the block such that relative movement of said block and casing will cause deformation of said deformable material, the deformable material having variable electrical resistance depending on forces applied to it; and
   current detecting means to detect current flow conducted through the deformable material at a plurality of faces of the polyhedral block, the current flow being substantially perpendicular or parallel to each of said plurality of faces of said polyhedral block.

10. A sensor according to claim 9, wherein the current detecting means includes electrodes positioned against the deformable material at each of said plurality of faces.

* * * * *